(12) United States Patent
Lucas et al.

(10) Patent No.: US 11,100,619 B2
(45) Date of Patent: Aug. 24, 2021

(54) IMAGE FORMATION

(71) Applicant: The University of Manchester, Manchester (GB)

(72) Inventors: Robert James Lucas, Manchester (GB); Annette Elizabeth Allen, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 16/076,602

(22) PCT Filed: Feb. 9, 2017

(86) PCT No.: PCT/GB2017/050338
§ 371 (c)(1),
(2) Date: Aug. 8, 2018

(87) PCT Pub. No.: WO2017/137756
PCT Pub. Date: Aug. 17, 2017

(65) Prior Publication Data
US 2019/0043179 A1    Feb. 7, 2019

(30) Foreign Application Priority Data
Feb. 9, 2016   (GB) .................... 1602272

(51) Int. Cl.
*G06T 5/00* (2006.01)
*H04N 1/60* (2006.01)
(Continued)

(52) U.S. Cl.
CPC ............ *G06T 5/009* (2013.01); *G09G 5/02* (2013.01); *G09G 5/10* (2013.01); *H04N 1/6002* (2013.01);
(Continued)

(58) Field of Classification Search
CPC ...... H04N 1/6002; H04N 1/6088; H04N 9/64; G06T 5/009; G06T 5/02; G06T 5/10; G06T 2207/10024; G09G 2320/0686
See application file for complete search history.

(56) References Cited

U.S. PATENT DOCUMENTS

| 5,227,863 A | 7/1993 | Bilbrey et al. |
| 5,553,204 A | 9/1996 | Hiroyuki |

(Continued)

FOREIGN PATENT DOCUMENTS

| CN | 1729697 A | 2/2006 |
| CN | 201054240 Y | 4/2008 |

(Continued)

OTHER PUBLICATIONS

International Search Report and Written Opinion of PCT/GB2017/050338, dated Apr. 24, 2017, 16 Pages.

(Continued)

*Primary Examiner* — Antoinette T Spinks
(74) *Attorney, Agent, or Firm* — Nixon Peabody LLP; Linda B. Huber

(57) ABSTRACT

Embodiments of the invention provide a method of processing colour image data comprising receiving image data corresponding to a first and a second region of an image having colour information represented in a first colour space; converting the colour information of the image data from the first colour space to a second colour space, the mapping being arranged to substantially maintain a perceived colour of the colour information and to select a meta-brightness of the first and second regions; and outputting the image data having colour information in the second colour space.

27 Claims, 3 Drawing Sheets

(51) Int. Cl.
*G09G 5/02* (2006.01)
*G09G 5/10* (2006.01)
*H04N 9/64* (2006.01)

(52) U.S. Cl.
CPC ..... *H04N 9/64* (2013.01); *G06T 2207/10024* (2013.01); *G09G 2320/0686* (2013.01); *G09G 2340/06* (2013.01); *G09G 2354/00* (2013.01); *H04N 1/6088* (2013.01)

(56) References Cited

U.S. PATENT DOCUMENTS

| | | | |
|---|---|---|---|
| 10,331,207 B1* | 6/2019 | Simmons | H04N 1/00129 |
| 2003/0128179 A1 | 7/2003 | Credelle | |
| 2003/0128225 A1 | 7/2003 | Credelle | |
| 2005/0073655 A1 | 4/2005 | Berman | |
| 2005/0169551 A1 | 8/2005 | Messing et al. | |
| 2009/0058873 A1 | 3/2009 | Elliott et al. | |
| 2011/0026027 A1 | 2/2011 | Edge | |
| 2012/0259392 A1 | 10/2012 | Feng et al. | |
| 2014/0104294 A1 | 4/2014 | Ben-Chorin et al. | |
| 2014/0184088 A1 | 7/2014 | Lu et al. | |
| 2014/0285429 A1 | 9/2014 | Simmons | |
| 2014/0353636 A1 | 12/2014 | Baek et al. | |
| 2017/0192504 A1* | 7/2017 | Simmons | G02B 27/225 |
| 2017/0354000 A1* | 12/2017 | Gordin | A61N 5/0618 |
| 2019/0043179 A1* | 2/2019 | Lucas | G09G 5/02 |
| 2019/0209858 A1* | 7/2019 | Slaughter | A61N 5/0613 |
| 2021/0049787 A1* | 2/2021 | Lucas | H05B 47/155 |
| 2021/0097943 A1* | 4/2021 | Wyatt | G02F 1/1335 |

FOREIGN PATENT DOCUMENTS

| | | |
|---|---|---|
| CN | 101595421 A | 12/2009 |
| CN | 102779353 A | 11/2012 |
| CN | 103223795 A | 7/2013 |
| GB | 778181 A | 7/1957 |
| JP | H05324931 A | 12/1993 |
| JP | 2002131133 A | 5/2002 |
| JP | 2009533127 A | 9/2009 |
| JP | 2009254479 A | 11/2009 |
| WO | 2005069786 A2 | 8/2005 |
| WO | 2008016015 A1 | 2/2008 |
| WO | 2017137756 A1 | 8/2017 |

OTHER PUBLICATIONS

International Preliminary Report on Patentability of PCT/GB2017/050338, dated Aug. 23, 2018, 9 Pages.
Search Report of GB 1602272.5, dated May 25, 2016, 3 Pages.
Search Report of GB 1806945.0, dated Oct. 26, 2018, 3 Pages.
Allen et al., Melanopsin-Driven Light Adaptation in Mouse Vision, 2014, Current Biology, vol. 24, Supplemental Information, 11 Pages.
Allen et al., Melanopsin-Driven Light Adaptation in Mouse Vision, 2014, pp. 1-29.
Allen et al., Melanopsin-Driven Light Adaptation in Mouse Vision, 2014, Current Biology, vol. 24(21), pp. 1-10.
Allen et al., The Spatial and Temporal Contributions of Melanopsin to Mouse Vision, Abstract, 2015, 2 Pages.
Allen et al., The Spatial and Temporal Contributions of Melanopsin to Mouse Vision, 2015, 7 Pages.
Brown et al., Melanopsin-Based Brightness Discrimination in Mice and Humans, 2012, Curent Biology, vol. 22(12), pp. 1-8.
Commission Internationale De L'Eclairage, Fundamental Chromaticity Diagram with Physiological Axes, Part 1, 2006, 56 Pages.
Commission Internationale De L'Eclairage, Fundamental Chromaticity Diagram with Physiological Axes, Part 2, Spectral Luminous Efficiency Functions and Chromaticity Diagrams, 2015, 72 Pages.
Stefani et al., Evaluation of Human Reactions on Displays with LED Backlight and a Technical Concept of a Circadian Effective Display, 2010, S I D International Symposium. Digest of Technical Papers, vol. 41(1), p. 1120.
Stockman et al, The Spectral Sensitivity of the Human Short-Wavelength Sensitive Cones Derived from Thresholds and Color Matches, 1999, Vision Research, vol. 39, pp. 2901-2927.
Stockman et al, The Spectral Sensitivities of the Middle- and Long-Wavelength-Sensitive Cones Derived from Measurements in Observers of Known Genotype, 2000, Vision Research, vol. 40, pp. 1711-1737.
CN OA for Application No. 201780010367.3 dated Dec. 3, 2020.

* cited by examiner

IMAGE FORMATION

CROSS-REFERENCE TO RELATED APPLICATIONS

This application is a National Phase of International Application No. PCT/GB2017/050338 filed Feb. 9, 2017, currently pending, which designated the U.S. and that International Application was published under PCT Article 21(2) in English. This application also includes a claim of priority under 35 U.S.C. § 119(a) and § 365(b) to British patent application No. GB 1602272.5 filed Feb. 9, 2016, the entirety of which is hereby incorporated by reference.

BACKGROUND

It is continually desired to form images which are more appealing to a viewer. Images may be formed as static images, such as printed or otherwise formed on a media or electronically formed on a display device. In the field of printing, innovations have included new ink or toner substances, methods of applying substances to the media and advancements in the media. Over recent years many new display technologies have emerged from cathode ray tube (CRT) to liquid crystal display (LCD), light emitting diode (LED) and, more recently, organic light emitting diode (OLED). Amongst the drivers for the development of these technologies has been the desire for more attractive images. A more recent interest has been in controlling displays to modulate their impact on one or more of circadian clocks, sleepiness and alertness.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

One aspect of producing attractive and realistic images is in representing image brightness. Image brightness may also have impact on a circadian clock, sleepiness and alertness of a viewer. Currently, brightness is determined by controlling a luminance of areas of an image where luminance is a photometric measure of light intensity relevant for cone receptors of the eye. Embodiments of the present invention provide a method and apparatus for processing colour image data, a display device for outputting an image and an imaging device where a meta-brightness of at least a portion of an image is controlled. Meta brightness, as will be explained, is a brightness of at least a portion of the image due to melanopsin excitation.

Figure 1:
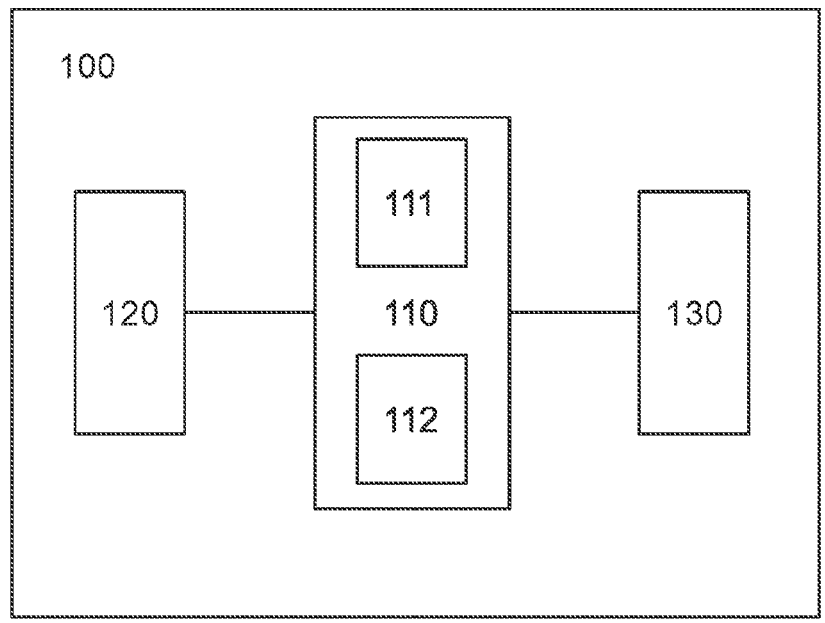
FIG. 1 shows a schematic illustration of a device according to an embodiment of the invention.

FIG. 1 illustrates an apparatus 100 according to an embodiment of the invention. The apparatus 100 is an apparatus for processing colour image data to control a meta-brightness of the image data. The meta-brightness of the image data may be controlled by the apparatus 100 whilst substantially maintaining a perceived colour of colour information in the image data.

The apparatus comprises a control unit 110, an input unit 120 for receiving image data and an output unit 130 for outputting image data. The control unit 110 comprises a processor 111 and a memory 112 which may be formed by one or more memory devices for storing data. The memory 112 stores data for allowing the processor to convert a first colour space of received image data to a second colour space in order to control the meta-brightness of the image data, as will be explained.

The input unit 120 is operative according to one or more predetermined standards to receive image data. The image data may be still image data or moving image data, such as formed by a plurality of still images as will be appreciated. The input unit 120 may form a wired or wireless interface for receiving the image data from another device (not shown in FIG. 1). The input unit 120 may be operative according to one or more predetermined standards to receive the image data such as IEEE 802.11, HDMI as defined by CEA-861 etc. It will be realized that the input unit 120 may conform to other standards and that these are merely exemplary.

The output unit 130 is arranged to output image data to an output device such as a display device or a printing device (not shown in FIG. 1). The image data may be still image data or moving image data, such as formed by a plurality of still images as will be appreciated. The output unit 130 may form a wired or wireless interface for outputting the image data to the display device. In one embodiment the output unit 130 is operative according to IEEE 802.11 although it will be realized that this is merely exemplary.

The image data received by the input unit 120 comprises colour information for regions of the image where the colour information is represented in a first colour space. The first colour space may define the colour of a region of the image data with respect to a plurality of primary colours or primaries. In some embodiments there may be three primary colours, although it will be realised that other numbers of primary colours may be used. The first colour space may be an RGB colour space, an XYZ colour space or a derivative thereof such as CIE-Lab. It will be appreciated that the afore-mentioned list is merely illustrative and is not limiting. For example, in the image data, a region such as a point location or pixel may have a colour defined by a plurality of values indicative of the colour of each of the primaries. For example, a numeric value may be used to define a colour level for each of red (R), green (G) and blue (B). Similarly, in a CIE colour space a colour of each location or pixel is defined by xy coordinates for hue and saturation and a Y value for luminance. Thus the CIE colour space defines a pixel in terms of xyY values. A further example first colour space is a colour defined by XYZ. In this way the colour of each region of the image data is defined in the first colour space.

The image data having colour information represented in the first colour space is communicated from the input unit 120 to the control unit 110. The control unit 110 is arranged to map the colour information of the image data from the first colour space to the second colour space. In particular, in some embodiments, the processor 111 is arranged to determine the colour information of a portion of the image data, such as for a region or pixel of the image data, and to convert the colour information from the first colour space to the second colour space. In one embodiment the processor 111 may perform the conversion by looking up in the memory 112 colour information corresponding to the second colour space based upon the first colour information in the first colour space. In other embodiments the processor 111 may use one or more predefined functions to convert the colour information from the first colour space to the second colour space.

The second colour space may comprise colour information and meta-brightness information. In some embodiments the second colour space further comprises luminance information. The colour information defines a colour of each location, the luminance information defines the luminance of a location, and the meta-brightness defines a meta-brightness of the location. The meta-brightness information may comprise an identification of one of a plurality of predetermined meta-brightness levels or states. As will be explained, in some embodiments, two meta-brightness levels are used. However, more than two meta-brightness levels may be used in some embodiments. In some embodiments of the invention, the second colour space comprises four primaries. In some embodiments the primary colours of the second colour space are Violet-Cyan-Red-Yellow (VCRY). It will be realised, however, that embodiments of the invention are not limited to four primaries and that other numbers of primaries, greater than four, may be envisaged.

In order to better understand embodiments of the invention a description will now be provided of an experimental arrangement and conversion between first and second colour spaces as an example.

Figure 2:
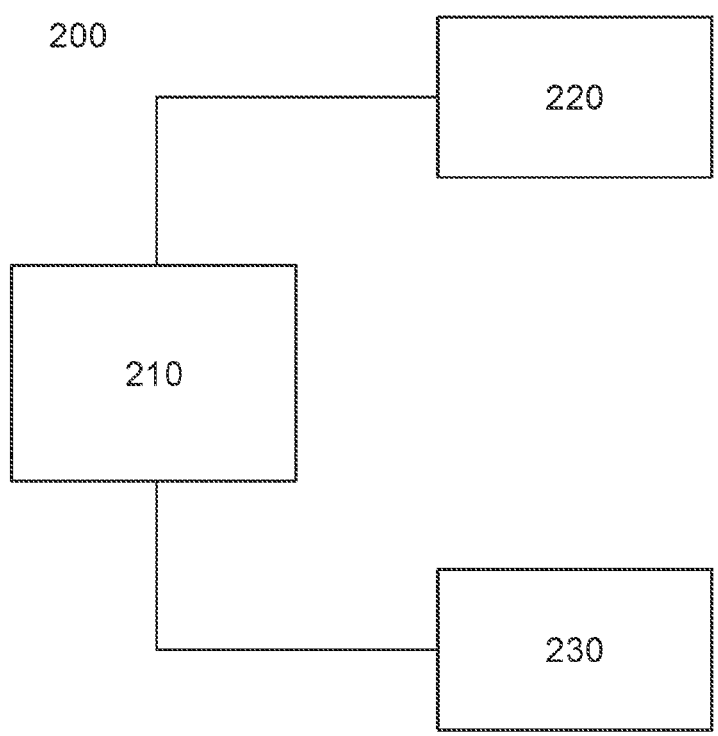
FIG. 2 shows an illustration of an output apparatus according to an embodiment of the invention.

FIG. 2 illustrates a system 200 according to an embodiment of the invention.

The system 200 is an image projection system comprising a computing device 210 communicatively coupled to first 220 and second 230 projection devices. The projection devices 220, 230 are arranged, responsive to the computing device 210, to project an image onto a surface. The projection devices 220, 230 each comprises a light source and image forming means for forming a colour image on the surface and are aligned such the image projected by each device 220, 230 is aligned on the surface. The computing device is arranged to control the projection devices 220, 230 and to provide image data thereto corresponding to which the projection devices 220, 230 project an image onto the surface i.e. both projection devices 220, 230 are controlled to receive the same image data from the computing device 210.

Figure 3:
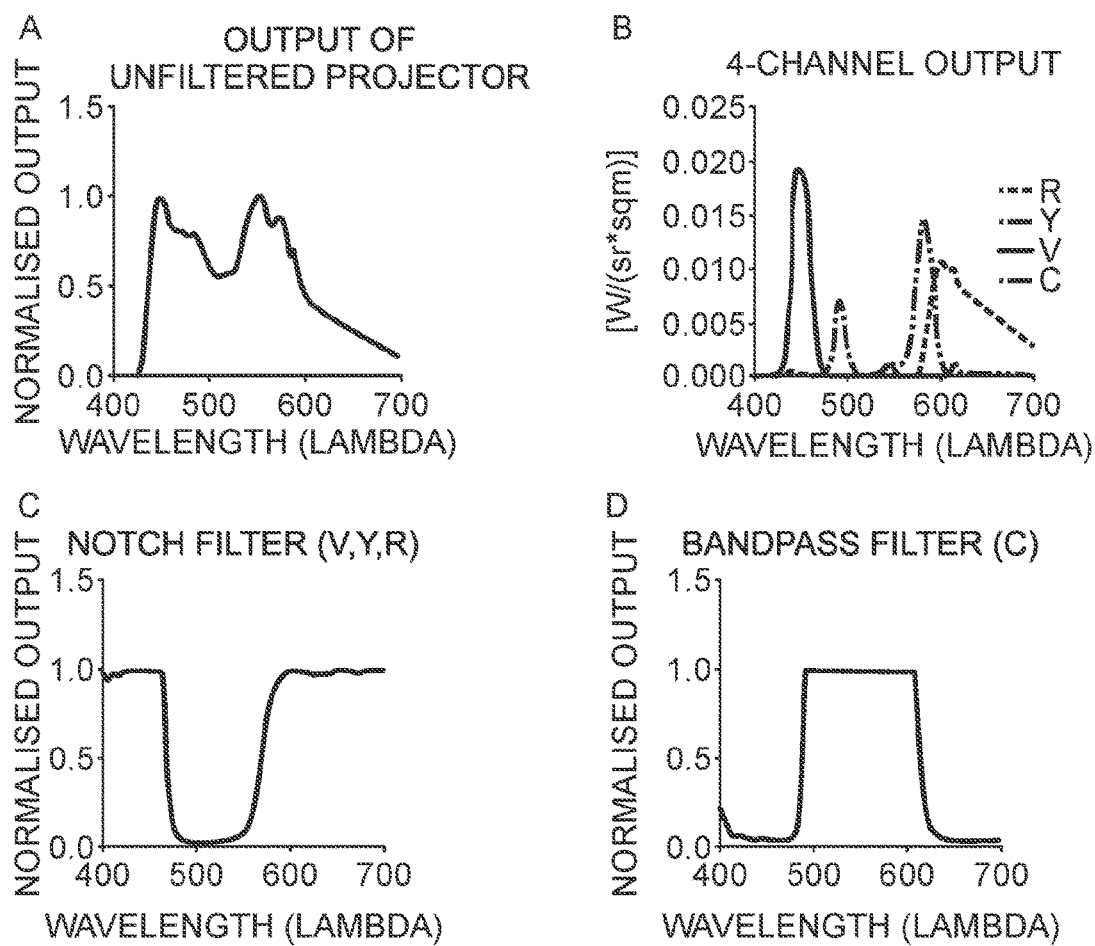
FIG. 3 shows an illustration of spectra according to an embodiment of the invention.

FIG. 3 illustrates a plurality of spectra useful for understanding embodiments of the present invention particularly with reference to FIG. 2. FIG. 3A illustrates a spectral output of each projector 220, 230 without any filtering. However it is desired to form an image in the VCRY colour space for controlling a meta-brightness of the image according to an embodiment of the invention. A spectrum of the VCRY colour space according to an embodiment of the invention is illustrated in FIGS. 3B and 5.

Figure 5:
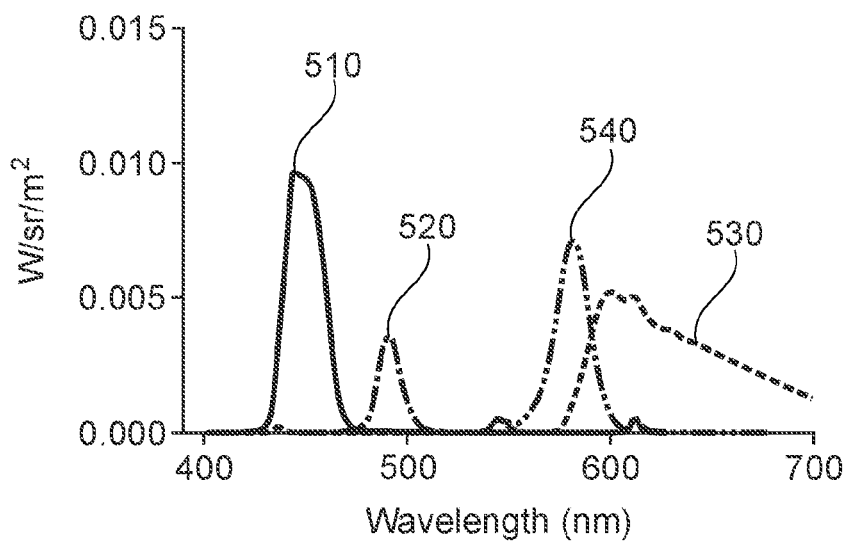
FIG. 5 shows an illustration of a further spectra according to an embodiment of the invention.

Referring more specifically to FIG. 5, the VCRY spectrum comprises a light emission region or peak corresponding to each of the VCRY colours. In one embodiment, a first peak 510 corresponding to violet (V) has a wavelength in the range 410-470 nm; a second first peak 520 corresponding to cyan (C) has a wavelength around 470-540 nm; third peak 530 corresponding to red (R) has a wavelength around 580-700 nm (in some embodiments the red wavelength may continue to, for example, 740 nm and a fourth peak 540 corresponding to yellow (Y) has a wavelength around 520-610 nm. However, one or more of the aforementioned peaks may be in the region of 430-470 nm for the first, violet, primary; 470-510 nm for the second, cyan, primary; 580-700 nm for the third, red, primary; and/or 560-610 nm for the fourth, yellow, primary. It will be realised that various combinations of the aforementioned ranges can be envisaged. In contrast to, for example, an RGB colour space, the second colour space does not comprise a single primary whose light emission wavelengths correspond to blue, where blue may be defined as a peak in a wavelength region of between 440-480 nm. In embodiments of the invention the VCRY spectrum comprises two primaries having peak wavelengths of less than 520 nm. The two primaries of less than 520 nm may be spaced apart. The spacing apart may be such that a gap or space in the VCRY spectrum exists somewhere between 440-480 nm which may correspond to blue wavelengths.

In order to form images in the VCRY colour space, the first projector 220 is equipped with a notch filter and the second projector is equipped with a bandpass filter. It will be realised that other methods of forming an image in the VCRY colour space may be envisaged. Spectral efficiency of the notch filer is illustrated in FIG. 3C and spectral efficiency of the bandpass filter is illustrated in FIG. 3D. The first projector 220 in combination with the notch filter is used to form V, Y and R channels of the image and the second projector 230 with the bandpass filter is used to form the C channel of the image. The notch filter may be a 463/571 nm magenta filter and the bandpass filter may be a 484/604 nm green filter, both available from Pixelteq, a subsidiary of Halma plc. It will be realised, however, that other filters of similar spectral efficiency may be used. By the computing device 210 providing image data to both the first and second projectors 220, 230 equipped with different filters to in combination project an image in the VCRY colour space, such that the meta-brightness of the image, or regions of the image, may be controlled, as will be explained. In particular, in one embodiment, the image comprises one or more regions having a first meta-brightness and one or more regions having a second meta-brightness. The first meta-brightness may be a higher level of meta-brightness, which may be referred to as m-HIGH, and the second meta-brightness level may be a lower level of meta-brightness, which may be referred to as m-LOW. It will be appreciated that other numbers of meta-brightness levels may envisaged.

Figure 6:
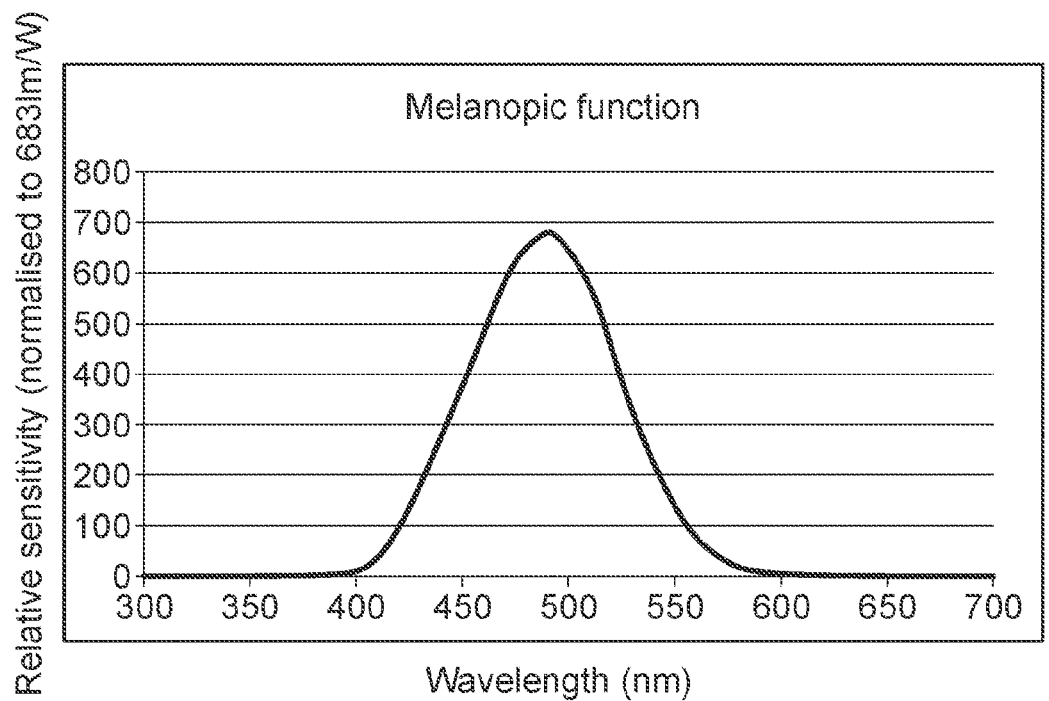
FIG. 6 illustrates a spectral sensitivity function for melanopsin according to an embodiment of the invention.

In embodiments of the invention, the VCRY primaries (each of the Violet-Cyan-Red-Yellow colours) are controlled to produce an image where pixels of both the m-HIGH and m-LOW states have generally the same hue, saturation and luminance. In some embodiments, one or two of these attributes may be regarded as more important than the other two or one, respectively. For example, the primaries may be controlled so that only the hue and saturation are generally equal between the two meta-brightness states. In embodiments of the invention the meta-brightness is defined by a spectral efficiency function or spectral sensitivity function, M. M may be influenced by or derived from a melanopsin spectral efficiency function representing a melanopsin response of the eye to wavelengths of light. An example plot of M against wavelength is illustrated in FIG. 6. The melanopsin spectral efficiency function represents a melanopsin response of the eye to wavelengths of light. As shown in FIG. 6, in one embodiment M has a peak response to wavelengths of light ($\lambda$max) of 480 nm. However it will be appreciated that $\lambda$max may be between 440 and 515 nm.

Figure 4:
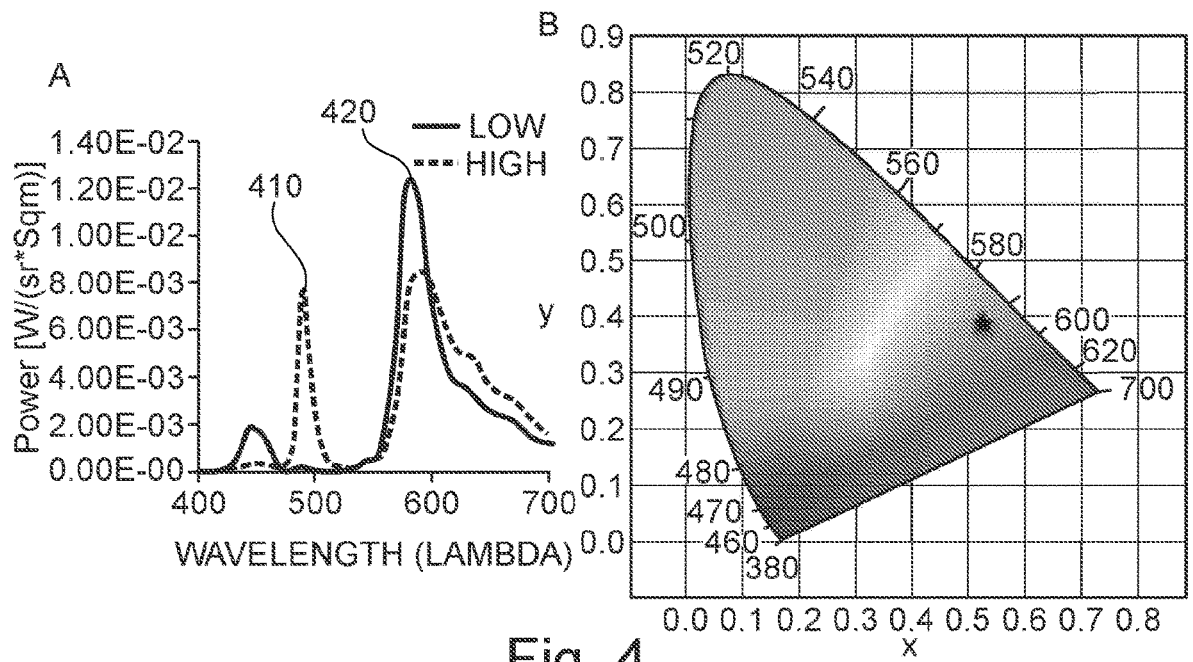
FIG. 4 shows an illustration of output spectra according to an embodiment of the invention.

Referring to FIG. 4, an illustration of a colour in xy colour space is shown with a location indicated with a star in FIG. 4B, and corresponding spectral output of VCRY primaries or channels is shown in FIG. 4A in the first and second meta-brightness levels, m-HIGH 410 and m-LOW 420. Thus to the viewer both combined spectral outputs appear the same colour, but vary in meta-brightness.

Explanation will now be provided of conversion from a first colour space to a second colour space, wherein the second colour space provides representation of a colour in the first colour space in varying meta-brightness configurations.

As noted above, a colour of a pixel may be represented in XYZ or RGB colour spaces as a set of respective coordinates. From these coordinates, hue and saturation may be described for the pixel as xy coordinates and luminance may be represented as Y in the CIE colour space for a given spectral output. Thus xyY values for a pixel may be derived from its XYZ or RGB values, as will be appreciated.

For combinations of the VCRY primaries of the second colour space, XYZ and M coordinates may be described. A value of M defines the meta-brightness in the second colour space. Such description is based upon a spectral power distribution for each channel or primary and a spectral efficiency function X for each of XYZ and M. The spectral power distribution for each primary is denoted as $Q_V$, $Q_C$, $Q_R$ and $Q_Y$, respectively. The spectral efficiency for M may be determined based upon a melanopic sensitivity function. A matrix may be provided, as below, which allows combinations of these functions to calculate XYZM coordinates for each VCRY primary.

| matrix 1 | | | | |
| --- | --- | --- | --- | --- |
| | V | C | R | Y |
| X | V(X) | C(X) | R(X) | Y(X) |
| Y | V(Y) | C(Y) | R(Y) | Y(Y) |
| Z | V(Z) | C(Z) | R(Z) | Y(Z) |
| M | V(M) | C(M) | R(M) | Y(M) |

Where, for example, V(X) is the X coordinate resulting from the output of the V primary.

Based on the above matrix 1 and above-mentioned functions, the following components may be calculated as:

$V(X) = \int Q_V(\lambda).X(\lambda).d(\lambda)$ $V(Y) = \int Q_V(\lambda).Y(\lambda).d(\lambda)$ $V(Z) = \int Q_V(\lambda).Z(\lambda).d(\lambda)$ $V(M) = \int Q_V(\lambda).M(\lambda).d(\lambda)$ (equations 1a, i-iv)

$C(X) = \int Q_C(\lambda).X(\lambda).d(\lambda)$ $C(Y) = \int Q_C(\lambda).Y(\lambda).d(\lambda)$ $C(Z) = \int Q_C(\lambda).Z(\lambda).d(\lambda)$ $C(M) = \int Q_C(\lambda).M(\lambda).d(\lambda)$ (equations 1b, i-iv)

$R(X) = \int Q_R(\lambda).X(\lambda).d(\lambda)$ $R(Y) = \int Q_R(\lambda).Y(\lambda).d(\lambda)$ $R(Z) = \int Q_R(\lambda).Z(\lambda).d(\lambda)$ $R(M) = \int Q_R(\lambda).M(\lambda).d(\lambda)$ (equations 1c, i-iv)

$Y(X) = \int Q_Y(\lambda).X(\lambda).d(\lambda)$ $Y(Y) = \int Q_Y(\lambda).Y(\lambda).d(\lambda)$ $Y(Z) = \int Q_Y(\lambda).Z(\lambda).d(\lambda)$ $Y(M) = \int Q_Y(\lambda).M(\lambda).d(\lambda)$ (equations 1d, i-iv)

Wherein, as noted above, Q is the spectral power distribution for the respective primary, such as violet (V) with respect to wavelength $\lambda$ and $X(\lambda)$ is the spectral efficiency function. Thus, for example, equation 1ai is used to determine the X coordinate provided by the V channel as V(X) etc.

An output of each primary may be defined as a value between first and second limits representing a minimum and maximum output, respectively. The limits may correspond to 0 and 255, respectively although it will be realised that other limits may be used. Thus the output of each primary may be a value in the range 0-255 in one embodiment. The output of each primary may be denoted as $v_i$, $c_i$, $r_i$, $y_i$. In order to determine the effect of the value of each primary output i.e. varying $v_i$, $c_i$, $r_i$, $y_i$ between 0 and 255 in one embodiment, gamma correction is used for each channel. In one embodiment, the gamma correction is assumed to be a scaling function described by constants $k_v$, $k_c$, $k_r$, $k_y$. It will be appreciated, however, that other gamma correction functions may be used. Therefore, the 4D (XYZM) second colour space coordinate of any pixel may be determined based upon values of its primaries i.e. on values of as $v_i$, $c_i$, $r_i$, $y_i$ based on Equations 2a-d.

$X = v_i.k_v.V(X) + c_i.k_c.C(X) + r_i.k_r.R(X) + y_i.k_y.Y(X)$ (equation 2a)

$Y = v_i.k_v.V(Y) + c_i.k_c.C(Y) + r_i.k_r.R(Y) + y_i.k_y.Y(Y)$ (equation 2b)

$Z = v_i.k_v.V(Z) + c_i.k_c.C(Z) + r_i.k_r.R(Z) + y_i.k_y.Y(Z)$ (equation 2c)

$M = v_i.k_v.V(M) + c_i.k_c.C(M) + r_i.k_r.R(M) + y_i.k_y.Y(M)$ (equation 2d)

where $v_i$ is output of primary v, for example, and may have a value between 0 and 255, $k_v$ is gamma correction for channel V, for example, and V([X, Y, Z, M]) is calculated as in Equation 1.

A method of applying the above teachings will now be described by way of an example. For a system having a predetermined spectral power distribution, such as the four channel VCRY output shown in FIG. 1B, an embodiment of matrix 1 may be determined as below:

| matrix 2 | | | | |
| --- | --- | --- | --- | --- |
| | V | C | R | Y |
| X | 55.9 | 1.9 | 392.7 | 235.0 |
| Y | 13.6 | 29.9 | 215.3 | 211.0 |
| Z | 300.0 | 28.7 | 8.6 | 8.7 |
| M | 82.5 | 74.4 | 1.3 | 13.5 |

The gamma correction of each channel may be approximated as 1 for simplicity i.e. wherein each of $k_v$, $k_c$, $k_r$, $k_y$ equal 1.

Matrix 2 is then used in combination with Equations 2a-d to determine two combinations of primary output values having different meta-brightness levels. In particular, the two combinations of primary output values may have respective meta-brightness levels of m-HIGH and m-LOW, respectively. That is, the two meta-brightness levels may have an appreciable difference in the M coordinate. In this example, the xy colour coordinates are 0.53 and 0.39, respectively, and the luminance is Y=250cd/m². The xy colour coordinates of 0.53 and 0.39 are those indicated in FIG. 4B. Matrixes 3 & 4 below summarise the combinations of primary output values for the meta-brightness levels. The primary output value is shown in square brackets and total XYZM output is shown in the final column denoted as Σ.

m-HIGH matrix 3

|   | V [20] | C [255] | R [150] | Y [140] | Σ |
|---|---|---|---|---|---|
| X | 2.6 | 1.9 | 220.9 | 106.7 | 334.3 |
| Y | 0.8 | 29.9 | 117.7 | 96.4 | 247.8 |
| Z | 14.2 | 28.7 | 0.0 | 0.0 | 44.8 |
| M | 4.51 | 74.41 | 0.73 | 4.49 | 84.6 | m-LOW matrix 4

|   | V [47] | C [0] | R[117] | Y [172] | Σ |
|---|---|---|---|---|---|
| X | 10.3 | 0.3 | 180.2 | 158.5 | 349.7 |
| Y | 2.5 | 1.8 | 98.8 | 142.3 | 249.1 |
| Z | 55.3 | 1.1 | 0.0 | 0.0 | 56.5 |
| M | 15.21 | 3.02 | 0.69 | 6.17 | 25.6 |

The VCRY spectra for each of matrix 3 & 4 are illustrated in FIG. 4A with trace 410 indicating the m-HIGH spectra and trace 420 indicating the m-LOW spectra.

The XYZ coordinates from each matrix may be converted to CIE colour space coordinates using equations 3a & 3b:

$$x = X/(X+Y+Z) \quad \text{(equation 3a)}$$

$$y = Y/(X+Y+Z) \quad \text{(equation 3b)}$$

Thus, xyY and M values may be determined for each of matrix 3 & 4 representing the colour in each of m-HIGH and m-LOW meta-brightness states. These are illustrated for the example colour coordinates in table 1 below along with a difference between the values for the two meta-brightness levels.

TABLE 1

|   | Σ HIGH | Σ LOW | DIFFERENCE (%) |
|---|---|---|---|
| x | 0.533 | 0.534 | 0% |
| y | 0.395 | 0.380 | -2% |
| Y | 247.8 | 249.1 | 0% |
| M | 84.6 | 25.6 | 54% |

It can be appreciated from table 1 that the values of xyY are relatively similar (max 2% difference), whilst the value of M is appreciably different (>50% difference) for the two meta-brightness levels.

It will be appreciated that for a given set of xyY and M values, VCRY settings may also be calculated. As described above, in an embodiment of the invention the spectral power distribution of the four VCRY primaries may be used to calculate their respective xyY and M coordinate values $(x_V y_V Y_V M_V, x_C y_C Y_C M_C, x_R y_R Y_R M_R$ and $x_Y y_Y Y_Y M_Y)$ using the methods above and in Equations 1a-d, 3a, and 3b). The xyY and M coordinates of any pixel may thus be defined by the relative outputs of the four primaries $K_V$, $K_C$, $K_Y$, and $K_R$. In an embodiment of the invention, these values may also be determined for any target xyY and M $(x_T y_T Y_T M_T)$ coordinate by solving the equations as denoted in Equations 4a-4d below.

$$x_T = \left(K_V * \left(\frac{x_V}{y_V}\right) + K_C * \left(\frac{x_C}{y_C}\right) + K_Y * \left(\frac{x_Y}{y_Y}\right) + K_R * \left(\frac{x_R}{y_R}\right)\right) / \left(\frac{K_V}{y_V} + \frac{K_C}{y_C} + \frac{K_Y}{y_Y} + \frac{K_r}{y_R}\right) \quad \text{(equation 4a)}$$

$$y_T = (K_V + K_C + K_Y + K_R) / \left(\frac{K_V}{y_V} + \frac{K_C}{y_C} + \frac{K_Y}{y_Y} + \frac{K_r}{y_R}\right) \quad \text{(equation 4b)}$$

$$Y_T = K_V * Y_V + K_C * Y_C + K_Y * Y_Y + K_R * Y_R \quad \text{(equation 4c)}$$

$$M_T = K_V * M_V + K_C * M_C + K_Y * M_Y + K_R * M_R \quad \text{(equation 4d)}$$

It will be appreciated that $M_T$ may be determined by an image capture device, or defined by a user. In some embodiments, not all values of $M_T$ are achievable for every target xyY coordinate, and thus a constraint on $M_T$ should be applied prior to calculation of $K_V$, $K_C$, $K_Y$, and $K_R$.

It will be appreciated that methods of calculating VCRY settings for given RGB and M values, such as described above, advantageously allows for the calculation of continuously variable meta-brightness levels.

As an informal test, a group of 10 people were confidentially asked to observe the output of the system 200 illustrated in FIG. 2 when viewing an image having a portion of increased meta-brightness. In particular the portion was configured as m-HIGH. Consistently viewers indicated the increased meta-brightness portion as being visibly brighter.

Embodiments of the present invention comprise a physical output representative of the second colour space. That is, the physical output comprises portions having controlled meta-brightness of at least a portion of an image. The physical output may be, for example, printed matter having a first portion of a first meta-brightness level and a second portion with a second meta-brightness level. The first meta-brightness level may be the m-HIGH level and the second meta-brightness level may be m-LOW meta-brightness level discussed above. The physical output may be produced by four primaries such as the VCRY primaries discussed above, wherein levels of each primary for each location on the printed matter are selected as described above to control the meta-brightness of the respective pixel.

In another embodiment, a display device is provided for outputting an image where the image has controlled meta-brightness of at least a portion of the image. The display device may be a projection device as described above. In other embodiments, the display device may be formed by illuminated pixels. In such embodiments the device may comprise a pixel array. The pixels of the array may be arranged in a vertical direction and a horizontal direction. Each pixel is arranged to output light in a one or more respective wavelength ranges selected from a plurality of wavelength ranges. The plurality of wavelength ranges are configured such that at least two of the wavelength range are selected to control meta-brightness of the respective pixel. The plurality of wavelength ranges may correspond to each of the VCRY primaries discussed above.

As discussed above, the VCRY spectrum comprises a peak corresponding to each of the VCRY colours. In one embodiment, a first peak 510 corresponding to violet (V) has a wavelength in the range 410-470 nm; a second first peak 520 corresponding to cyan (C) has a wavelength around 470-540 nm; third peak 530 corresponding to red (R) has a wavelength around 580-700 nm (in some embodiments the red wavelength may continue to, for example, 740 nm and a fourth peak 540 corresponding to yellow (Y) has a wavelength around 520-610 nm. However, one or more of the aforementioned peaks may be in the region of 430-470 nm for the first, violet, primary; 470-510 nm for the second, cyan, primary; 580-700 nm for the third, red, primary; and/or 560-610 nm for the fourth, yellow, primary. It will be realised that various combinations of the aforementioned ranges can be envisaged. In contrast to, for example, an RGB colour space, the second colour space does not comprise a single set of light emission wavelengths corresponding to blue, as explained above.

As noted above, in some embodiments of the invention there may be more than four primaries.

In this way the display device is able to control the meta-brightness of each pixel such that pixels may represent a desired colour but with a selected meta-brightness. The selected meta-brightness may be one of the first meta-brightness level and the second meta-brightness level. The first meta-brightness level may be the m-HIGH level and the second meta-brightness level may be m-LOW meta-brightness level. In some embodiments, the display device is arranged to receive image data having colour information represented in a first colour space, such as XYZ or RGB and to perform conversion on the colour information of the image data from the first colour space to the second colour space, before outputting the image data in the second colour space. As discussed, the mapping is arranged to substantially maintain the perceived colour of the colour information and to select the meta-brightness of the image data. In some embodiments the display device performs conversion from the first colour space, such as XYZ or RGB to the second colour space, which may be VCRY.

In an embodiment of the present invention an image capture device is provided which is configured to determine a meta-brightness of image data. The image capture device comprises a means for generating image data having a response function similar to M, an example of which is shown in FIG. 6. The imaging device in one embodiment comprises one or more spectral channel corresponding to the melanopsin spectral sensitivity function, M.

In an embodiment of the invention, there is provided an image capture device, such as a camera, comprising image capture means for recording a meta-brightness and generating image data thereof. In an embodiment of the present invention, the image capture device comprises at least one filter to capture a meta-brightness level. Previously, cameras have comprised sub-pixels arranged to incorporate optical filters for capturing and recording values in a first colour space, i.e. on R, G, and B colour planes. In order to capture a meta-brightness level, however, the camera may comprise a fourth sub-pixel. The four sub-pixels may comprise optical filters responsive to a second colour space, i.e. a VCRY colour plane. In an embodiment of the invention, each sub-pixel may be associated with an optical filter corresponding to VCRY display primaries. In operation, the spectral transmission of the optical filter may be determined to match the emission of the corresponding second colour space, such as the V, C, R, or Y colour plane.

In an embodiment of the invention, there is provided an image capture device, such as a camera, comprising a plurality of optical filters arranged to capture values in a first colour space, such as a colour, luminance, and meta brightness of a point in visual space, and produce image data accordingly. In some embodiments, the image data may be generated in a different colour space to the first colour space. In some embodiments, the image data may be output to a processing means arranged to map the image data from the first colour space to the second colour space. In some embodiments, a perceived colour and meta-brightness of the image data may be maintained between the first colour space and the second colour space. The image capture device may comprise a means for generating image data having a response function similar to M. The image data may be reproduced on an output device by four primaries such as the VCRY primaries discussed previously, or any four primary display with appropriate gamma settings.

In an embodiment of the invention where the image data is reproduced on an output device by four or more image display primaries, such as the VCRY primaries, the VCRY image data may also be reproduced by determining one or more gamma correction parameters associated with the image display primaries. The gamma correction parameters may be based on a difference in location in xyYM colour space of the captured image data and the image display primaries.

The filters may selectively transmit wavelengths of light corresponding to ranges for peak emission of VCRY display primaries. For example, in one embodiment a first peak corresponding to violet (V) has a wavelength in the range 410-470 nm; a second first peak corresponding to cyan (C) has a wavelength around 470-540 nm; third peak corresponding to red (R) has a wavelength around 580-700 nm (in some embodiments the red wavelength may continue to, for example, 740 nm) and a fourth peak corresponding to yellow (Y) has a wavelength around 520-610 nm. However, one or more of the aforementioned peaks may be in the region of 430-470 nm for the first, violet, primary; 470-510 nm for the second, cyan, primary; 580-700 nm for the third, red, primary; and/or 560-610 nm for the fourth, yellow, primary. It will be realised that various combinations of the aforementioned ranges can be envisaged.

In further embodiments of the invention, there is provided an image capture device arranged to capture image data and to output the image data according to an RGB display. The image capture device may be arranged to capture a colour, luminance, and meta brightness of a point in visual space, and output image data accordingly. The image capture device may comprise a means for generating image data having a response function similar to M. In such embodiments of the invention, the image capture device may be arranged to output image data according to an RGB spectrum, wherein the value of M from the captured image may be included in defining luminance of the output image data. Advantageously this allows the display of captured image data on existing RGB display architectures.

In experimental tests involving an embodiment of the present invention, a display device was provided for outputting a projection of a large disk that was rendered in m-HIGH and m-LOW spectrums. As is consistent with the invention, the spectra were matched for xy colour coordinates and luminance, however differed in their relative melanopsin excitation. Members of the public were asked to choose which of the two projected large circles was 'brighter'. The results showed that 112 out of 120 people selected the m-HIGH projection. When asked to describe the difference between m-HIGH and m-LOW images, the m-HIGH projection was described as appearing more 'intense' or 'vivid'.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of processing colour image data, comprising: receiving image data corresponding to a first and a second region of an image having colour information represented in a first colour space; converting the colour information of the image data from the first colour space to a second colour space, wherein the second colour space comprises colour information and meta-brightness information, the converting being arranged to substantially maintain a perceived colour of the colour information and to select a meta-brightness of the first and second regions, wherein the meta-brightness is indicative of a melanopsin response of an eye of a viewer to predetermined wavelengths of light and wherein the selected meta-brightness of the first region is different to the selected meta-brightness of the second region, such that the second region appears visibly brighter due to melanopsin excitation than the first region; and outputting the image data having colour information in the second colour space.

2. The method of claim 1, wherein the second colour space comprises at least four colour primaries.

3. The method of claim 1, wherein the second colour space comprises information indicative of a violet primary and a cyan primary.

4. The method of claim 1, wherein one or both of the first and second regions is a point location or pixel of the image.

5. The method of claim 1, wherein the second colour space comprises a first primary having a wavelength in the range 410 to 470 nm.

6. The method of claim 1, wherein the second colour space comprises a second primary having a wavelength in the range 470 to 540 nm.

7. The method of claim 1, wherein the second colour space comprises a third primary having a wavelength in the range 580 to 740 nm.

8. The method of claim 1, wherein the second colour space comprises a fourth primary having a wavelength in the range 520 and 610 nm.

9. The method of claim 1, wherein the second colour space comprises information indicative of violet, cyan, red and yellow primaries.

10. The method of claim 1, wherein the selecting of the meta-brightness level for the first and second regions comprises selecting between one of a plurality of meta-brightness levels of the image data in the second colour space.

11. The method of claim 10, wherein the plurality of meta-brightness levels comprise a first meta-brightness level representative of high meta-brightness and a second meta-brightness level representative of low-meta-brightness.

12. The method of claim 11, wherein the first and second meta-brightness levels differ in output by at least 20% for some colours.

13. The method of claim 1, wherein the converting is based upon an output spectra in the second colour space, a spectral power distribution of each primary in the second colour space and a spectral efficiency function for each primary in the first colour space and the meta-brightness.

14. The method of claim 13, wherein the spectral efficiency function for the meta-brightness is a melanopic sensitivity function.

15. A display device for outputting an image, comprising
a pixel array arranged in a vertical direction and a horizontal direction, each pixel being arranged to output light in a respective wavelength range selected from a plurality of wavelength ranges;
wherein the plurality of wavelength ranges are configured such that at least two of the wavelength range are selected to each control a colour and a meta-brightness of the image, wherein the meta-brightness is indicative of a melanopsin response of an eye of a viewer to predetermined wavelengths of light and wherein the selected meta-brightness of the first region is different to the selected meta-brightness of the second region, such that the second region appears visibly brighter due to melanopsin excitation than the first region; and
wherein the display device is arranged to receive image data in a colour space comprising colour information and meta-brightness information.

16. The display device of claim 15, wherein pixel array comprises at least four colour wavelength ranges.

17. The display device of claim 15, wherein the pixel array comprises a violet pixel and a cyan pixel.

18. The display device of claim 15, wherein the pixel array does not comprise a blue primary.

19. The display device of claim 15, wherein the pixel array comprises a first pixel having a wavelength in the range 410 to 470 nm.

20. The display device of claim 15, wherein the pixel array comprises a second pixel having a wavelength in the range 470 to 540 nm.

21. The display device of claim 15, wherein the pixel array comprises a third pixel having a wavelength in the range 580 to 740 nm.

22. The display device of claim 15, wherein the pixel array space comprises a fourth pixel having a wavelength in the range 520 and 610 nm.

23. The display device of claim 15, wherein the pixel array comprises pixels arranged to output violet, cyan, red and yellow primary colours.

24. A printing device for outputting an image onto a print media, comprising
- a plurality of print modules arranged to each output a colourant having a respective colour, wherein the colours are selected such that at least two of the colours are selected to each control a colour and a meta-brightness of an image printed onto the print media, wherein the meta-brightness is indicative of a melanopsin response of an eye of a viewer of the image to predetermined wavelengths of light and wherein the selected meta-brightness of the first region is different to the selected meta-brightness of the second region, such that the second region appears visibly brighter due to melanopsin excitation than the first region; and
- wherein the printing device is arranged to receive image data in a colour space comprising colour information and meta-brightness information.

25. An image capture device comprising image capture means for recording a meta-brightness and generating image data indicative thereof and optical filters for recording values in a first colour space, wherein the generated image data is output to a processing means arranged to map the image data from the first colour space to a second colour space, wherein the second colour space comprises colour information and meta-brightness information, the mapping being arranged to substantially maintain a perceived colour of the colour information and a meta-brightness of first and second regions of the image data, wherein the meta-brightness is indicative of a melanopsin response of an eye of a viewer to predetermined wavelengths of light and the meta-brightness of the first region is different to a meta-brightness of the second region, such that the second region appears visibly brighter due to melanopsin excitation than the first region.

26. The device of claim 25, wherein the image capture means is arranged to generate image data in a different colour space to the first colour space.

27. Computer software stored on a computer-readable medium which, when executed by a computer, is arranged to perform a method according to claim 1.

* * * * *